(12) United States Patent
Wallace et al.

(10) Patent No.: US 8,270,927 B2
(45) Date of Patent: Sep. 18, 2012

(54) ADAPTIVE INTERFERENCE FILTERING

(75) Inventors: Raymond C. Wallace, San Diego, CA (US); Charles E. Wheatley, III, Del Mar, CA (US); Stanley Slavko Toncich, San Diego, CA (US)

(73) Assignee: QUALCOM, Incorporated, San Diego, CA (US)

( * ) Notice: Subject to any disclaimer, the term of this patent is extended or adjusted under 35 U.S.C. 154(b) by 968 days.

(21) Appl. No.: 10/983,051

(22) Filed: Nov. 4, 2004

(65) Prior Publication Data
US 2005/0215204 A1 Sep. 29, 2005

Related U.S. Application Data

(60) Provisional application No. 60/557,760, filed on Mar. 29, 2004.

(51) Int. Cl.
H04B 1/10 (2006.01)
(52) U.S. Cl. .............. 455/295; 455/222; 455/278.1; 455/283; 455/296; 455/570; 375/240.29; 375/346
(58) Field of Classification Search .......... 455/570, 455/222, 278.1, 283, 296
See application file for complete search history.

(56) References Cited

U.S. PATENT DOCUMENTS

| | | | |
|---|---|---|---|
| 5,283,531 A * | 2/1994 | Serizawa et al. ........... 329/316 |
| 5,721,194 A * | 2/1998 | Yandrofski et al. ........ 505/210 |
| 6,058,148 A * | 5/2000 | Whikehart et al. ......... 375/350 |
| 6,472,957 B1 * | 10/2002 | Dobrovolny ................ 333/174 |
| 6,631,273 B1 * | 10/2003 | Eswein et al. .............. 455/462 |
| 6,717,980 B1 | 4/2004 | Rishi ........................... 375/219 |
| 7,078,872 B2 * | 7/2006 | Bertsch et al. .............. 318/610 |
| 7,283,543 B1 * | 10/2007 | Thompson ................... 370/401 |
| 2002/0072344 A1 * | 6/2002 | Souissi ......................... 455/296 |
| 2004/0048576 A1 | 3/2004 | Hildebrand et al. ........ 455/673 |
| 2004/0176034 A1 | 9/2004 | Hunter et al. .............. 455/63.1 |

FOREIGN PATENT DOCUMENTS

| | | |
|---|---|---|
| JP | 0349678 | 12/2000 |
| JP | 2003530756 | 10/2003 |
| WO | 0178242 | 10/2001 |

OTHER PUBLICATIONS

International Search Report—PCT/US05/007157, International Searching Authority—European Patent Office, Jun. 1, 2005.
Written Opinion—PCT/US05/007157, International Searching Authority—European Patent Office, Jun. 1, 2005.
International Preliminary Report on Patentability—PCT/US05/007157—IPEA/US, Jul. 23, 2007.

* cited by examiner

*Primary Examiner* — Zhiyu Lu
(74) *Attorney, Agent, or Firm* — Nicholas J. Pauley; Ramin Mobarhan (57) ABSTRACT

Systems and techniques for adaptive interference filtering in a communications device are disclosed. The communications device may include a transmitter, a receiver, a duplexer coupled to the transmitter and the receiver, and an adaptive filter disposed between the duplexer and the receiver. A processor may be configured to monitor cross modulation in the receiver between transmitter leakage through the duplexer and a jammer, and adapt the filter to vary its transmit signal rejection as a function of the cross modulation.

29 Claims, 6 Drawing Sheets

ADAPTIVE INTERFERENCE FILTERING

RELATED APPLICATIONS

This application claims priority to U.S. Provisional Application Ser. No. 60/557,760 filed Mar. 29, 2004.

FIELD

The present disclosure relates generally to communications, and more specifically, to adaptive filtering techniques.

BACKGROUND

Code division multiple access (CDMA) is quickly becoming the predominant worldwide wireless technology, due to its high subscriber capacity and its immunity to interference. As a result, consumer demand for high performance wireless communication devices has never been higher and there is no indication that this trend will decrease in the near future.

When designing high performance CDMA wireless communication devices, the issue of cross modulation between transmitter leakage at the receiver input and a jammer signal presents difficult challenges. Depending on the transmit power of the CDMA wireless communications device and the jammer signal power, a cross modulation spectrum may be produced at the output of the low noise amplifier (LNA) at the front-end of the receiver. This cross modulation spectrum may overlap the desired signal, and as a result, degrade the sensitivity of the receiver.

One way to reduce cross modulation is to increase the linearity of the LNA, or increase its IIP3 (3rd order Input intercept point). The problem with this approach is that any increase in linearity of the LNA results in a corresponding increase in power consumption, thereby creating an undesirable drain on the battery. This may result in reduced standby and talk time on the CDMA wireless communications device.

Another approach is to reduce the transmitter leakage at the input to the receiver. This may be achieved by either decreasing the transmit power of the wireless communications device, or increasing the transmit signal rejection of the duplexer. The reduction in transmit power may not be desirable, or even possible, when the user on the wireless communications device is traveling along the cellular boundaries. Increasing the duplexer's transmit signal rejection, on the other hand, is quite possible, and may be implemented with internal filtering. The drawback of this approach is that the in-band insertion loss of the duplexer is increased, which may needlessly degrade the sensitivity of the receiver when the transmit power of the wireless communications device is low. Accordingly, there is a need in the art for an adaptive filter that varies the transmit signal rejection as a function of the transmit power level of the wireless communications device and the jammer signal power.

SUMMARY

In one aspect of the present invention, a communications device includes a transmitter, a receiver, a duplexer coupled to the transmitter and the receiver, an adaptive filter disposed between the duplexer and the receiver, and a processor configured to monitor cross modulation in the receiver between transmitter leakage through the duplexer and a jammer, and adapt the filter to vary its transmit signal rejection as a function of the cross modulation.

In another aspect of the present invention, a method of adaptive filtering is performed in a communications device. The communications device includes a transmitter, a receiver, a duplexer coupled to the transmitter and the receiver, and an adaptive filter disposed between the duplexer and the receiver. The method includes monitoring cross modulation in the receiver between transmitter leakage through the duplexer and a jammer, and adapting the filter to vary its transmit signal rejection as a function of the cross modulation in the receiver.

In yet another aspect of the present invention, a communications device includes a transmitter, a receiver, a duplexer coupled to the transmitter and the receiver, and means, disposed between the duplexer and the receiver, for varying transmit signal rejection as a function of cross modulation in the receiver between transmitter leakage through the duplexer and a jammer.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

In the following detailed description, various filtering techniques may be described in the context of a CDMA wireless communications device. While these filtering techniques may be well suited for use in this application, those skilled in the art will readily appreciate that these inventive aspects are likewise applicable in various other communication and/or electronic devices. Accordingly, any reference to a CDMA wireless communications device is intended only to illustrate the inventive aspects, with the understanding that such inventive aspects have a wide range of applications.

Figure 1:
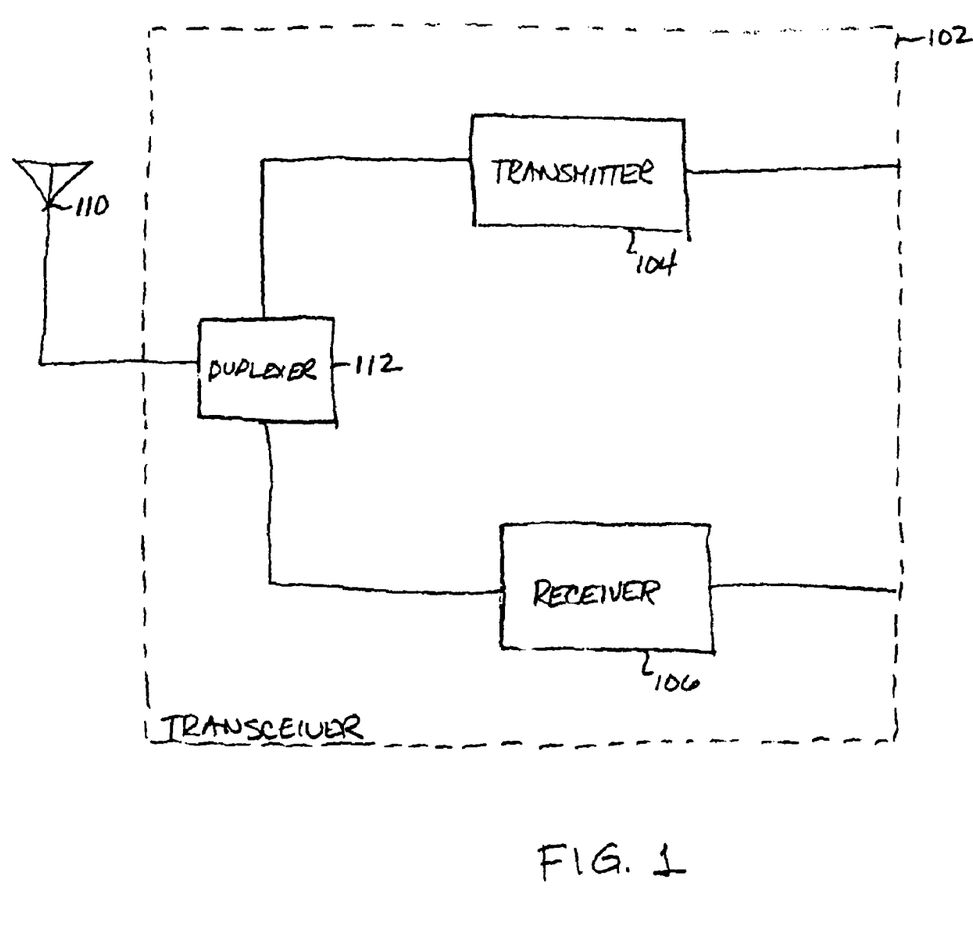
FIG. 1 is a functional block diagram illustrating an example of a transceiver for a wireless communications device.

FIG. 1 is a functional block diagram of a transceiver for a CDMA wireless communications device. The transceiver 102 is shown with a transmitter 104. The purpose of the transmitter 104 is to modulate a carrier signal with baseband information generated by a processor (not shown). The baseband information may be in the form of data, or the voice of the user engaged in a call. The transmitter 104 may also be used to amplify the modulated carrier to a sufficient power level for radiation into free space. The power level of the transmitter may be controlled by a power control loop that adjusts the power as a function of the path loss to the base station and the varying multipath environment. This may be achieved by measuring the signal strength of the transmission received at the base station and providing feedback to the CDMA wireless communications device.

The transceiver 102 is also shown with a receiver 106. The purpose of the receiver 106 is to detect desired signals in the presence of noise and interference, and to amplify those signals to a level where information contained in the received signal can be processed. A LNA (not shown) positioned at the front end of the receiver 106 may be used to provide high gain with good noise figure performance. The processed information may be data, or voice from a person at the other end of the call.

In the case of voice communications, the transceiver 102 may be configured for full-duplex operation so that both parties on the call can speak at once. To achieve full-duplex operation, the transmitter 104 and receiver 106 may be connected to an antenna 110 through a duplexer 112, with the transmit and receive frequencies offset. Because the duplexer 112 does not have infinite isolation, power from the transmitter 104 may leak back into the receiver 106.

Figure 2A:
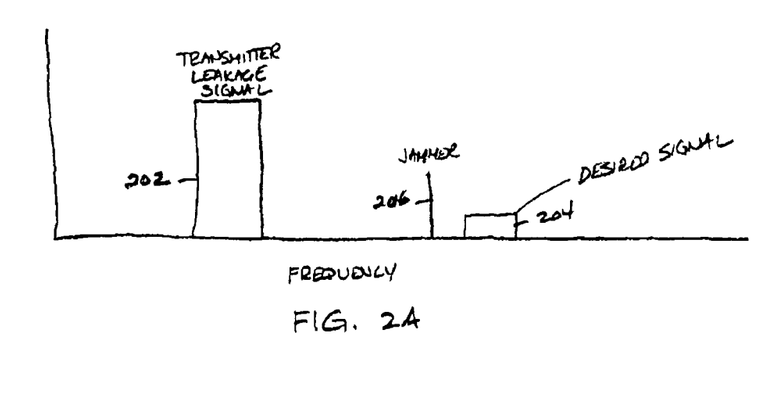
FIG. 2A is a graph illustrating an example of the frequency spectrum of the energy at the input to the receiver in a wireless communication device.
Figure 2B:
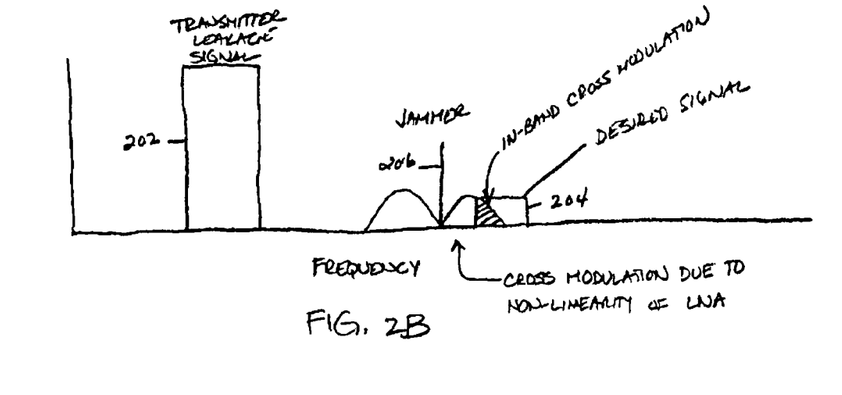
FIG. 2B is a graph illustrating an example of the frequency spectrum of the energy at the output of a low noise amplifier in the receiver of FIG. 2A.

The cross modulation between transmitter leakage at the receiver input and a jammer may impact the performance of the receiver 106. FIG. 2A shows the signal spectrum at the input to the receiver with the leakage from the transmitter 202 offset from the receiver frequency band 204 by design, and a jammer signal 206 relatively close to the receiver frequency band 204. Depending on the power level of the transmitter 104 and the jammer signal power, a cross modulation spectrum may be produced at the output of the LNA as shown in FIG. 2B. This cross modulation spectrum 208 may overlap the signal of interest 204, and as a result, degrade the sensitivity of the receiver.

The transceiver may be implemented with an adaptive filter to enhance receiver sensitivity. The adaptive filter may be used to increase the transmit signal rejection in the receiver in the presence of jammers when the power of the transmitter is high. The adaptive filter may reduce the transmit signal rejection when either the power level of the transmitter is reduced or when the signal power of the jammer is low. By decreasing the transmit signal rejection in the receiver under these conditions, the sensitivity of the receiver may be increased by decreasing the in-band insertion loss. This may allow the receiver to adapt a more optimal operating point that is currently not possible with conventional fixed filtering schemes.

Figure 3:
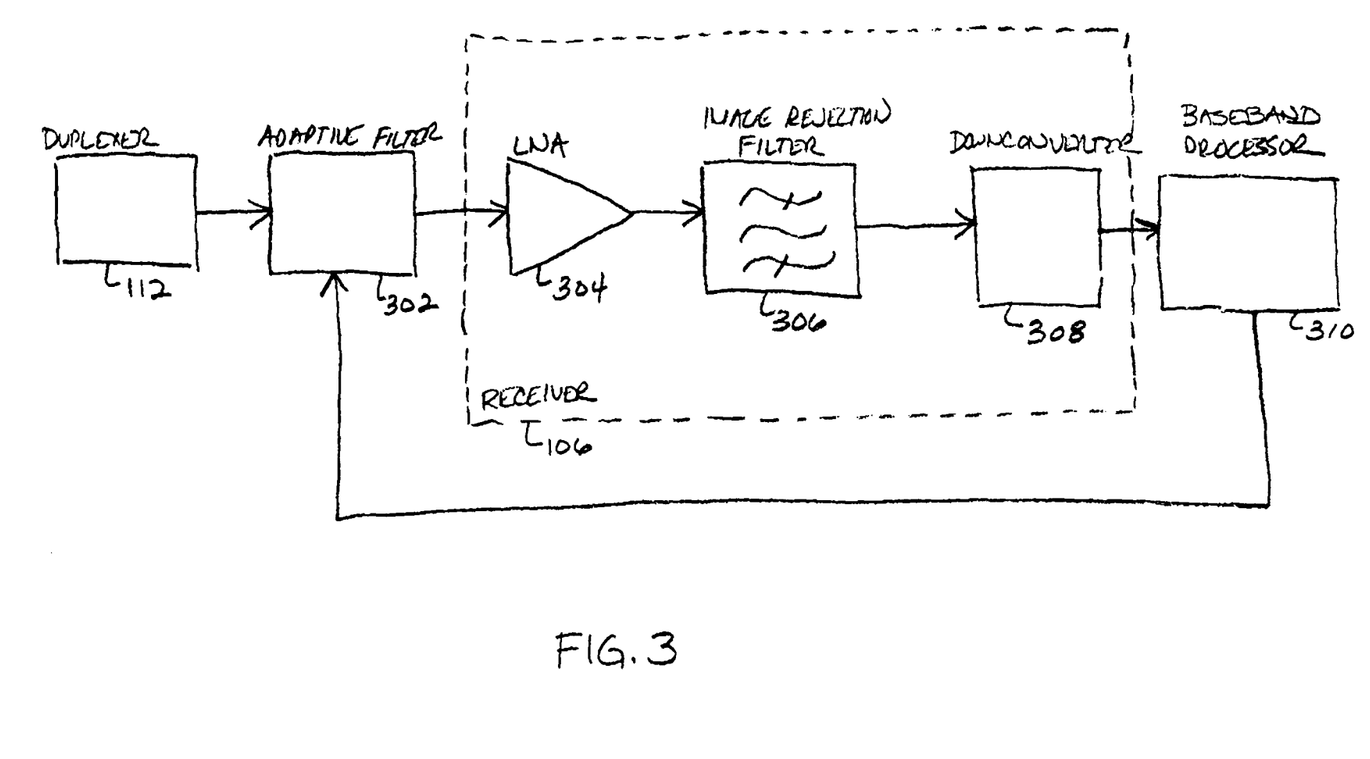
FIG. 3 is a detailed functional block diagram illustrating an example of a transceiver for a wireless communications device.

FIG. 3 is a functional block diagram of a receiver for use in a CDMA wireless communications device. The following description of the receiver will be simplified to emphasize the inventive concept without unnecessary detail. The actual implementation of the receiver may be more complex, and may include, by way of example, a complex (I-Q) architecture, which is well known in the art, and therefore, will not be discussed. In addition, various amplifying and filtering stages that might be used during actual implementation that are not pertinent to the invention will be omitted. It is understood that those skilled in the art will be able to design and construct actual receivers in accordance with the principles set forth herein.

Referring to FIG. 3, the LNA 304 may be positioned at the front end of the receiver 106 to amplify the transmission received by wireless communications device with good noise figure performance. An adaptive filter 302 may be positioned between the LNA 304 and the duplexer 112 to adaptively vary the transmit signal rejection at the input to the receiver 106. The adaptive filter 302 is shown as a separate entity in FIG. 3, but could be integrated into either the duplexer 112 or the receiver 302 depending upon the particular commercial embodiment. In any event, an interstage filter 306 may be used to reject out of band signals produced by the LNA 304. A downconverter 308 may be used to downconvert the output signal from the image rejection filter 304 to an intermediate frequency (IF), or in the case of a direct conversion receiver, to baseband. In the case of IF, additional downconversion stages (not shown) in the receiver 106 may be used to drop the signal to baseband before being provided to a baseband processor 310. The baseband processor 310 may be used to provide various signal processing functions, such as digitization, demodulation, and decoding, before the information contained in the signal is presented to the user as data or voice.

Figure 4:
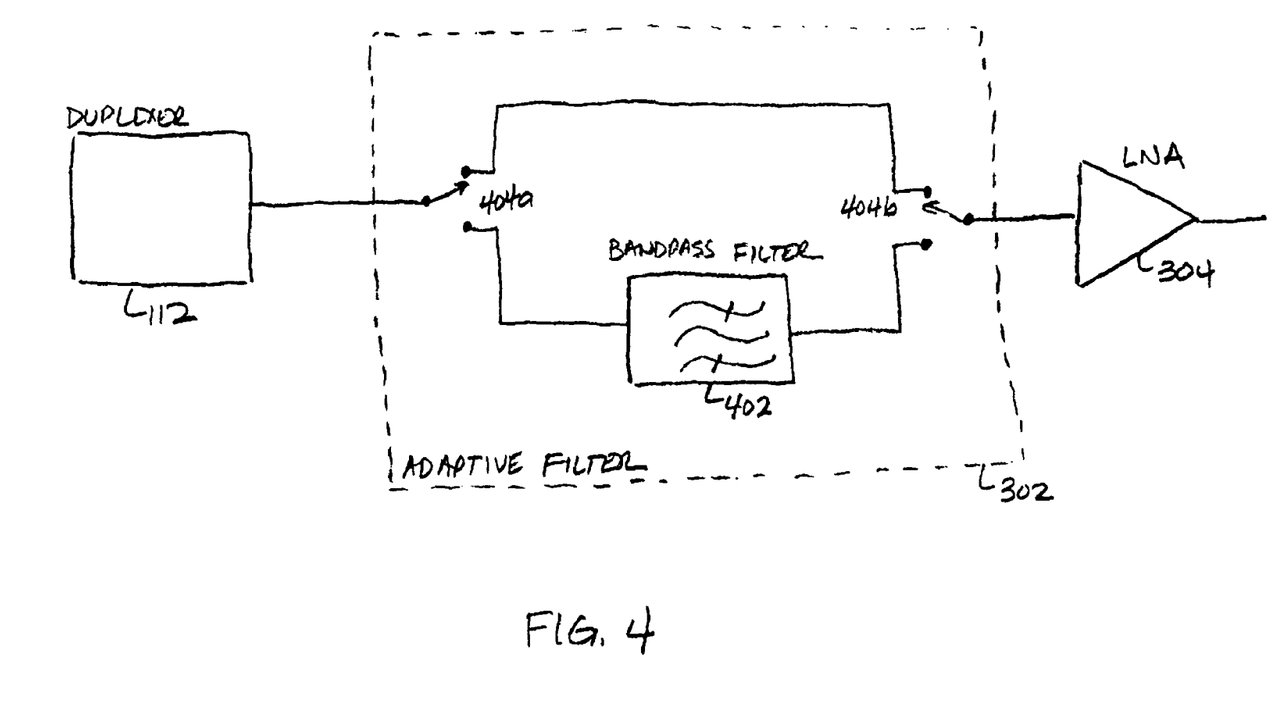
FIG. 4 is a schematic diagram illustrating an example of a switch filter for use in a transceiver of a wireless communications device.

The adaptive filter may be implemented as a switch filter, a tunable filter, or any other suitable filter. A switch filter in a CDMA receiver is shown in FIG. 4. The switch filter may include a filter 402 having a bandpass frequency centered at the receiver operating frequency, with good transmit signal rejection. A switching circuit having a pair of SPDT (single-pole-double-throw) switches 404a and 404b may be used to connect the filter 402 between the duplexer 112 and the LNA 304 in the presence of jammers when the transmit power is high. The switching circuit may be used to bypass the filter 402 by connecting the duplexer 112 directly to the LNA 304 when the wireless communications device is operating in a jammer free environment, or even when the wireless communication device is operating in the presence of jammers, if the power level of the transmitter is low enough to avoid cross modulation from significantly impacting receiver performance. The switches 404a and 404b may be any switches known in the art, such as high intercept point microwave switches or the like.

Figure 5:
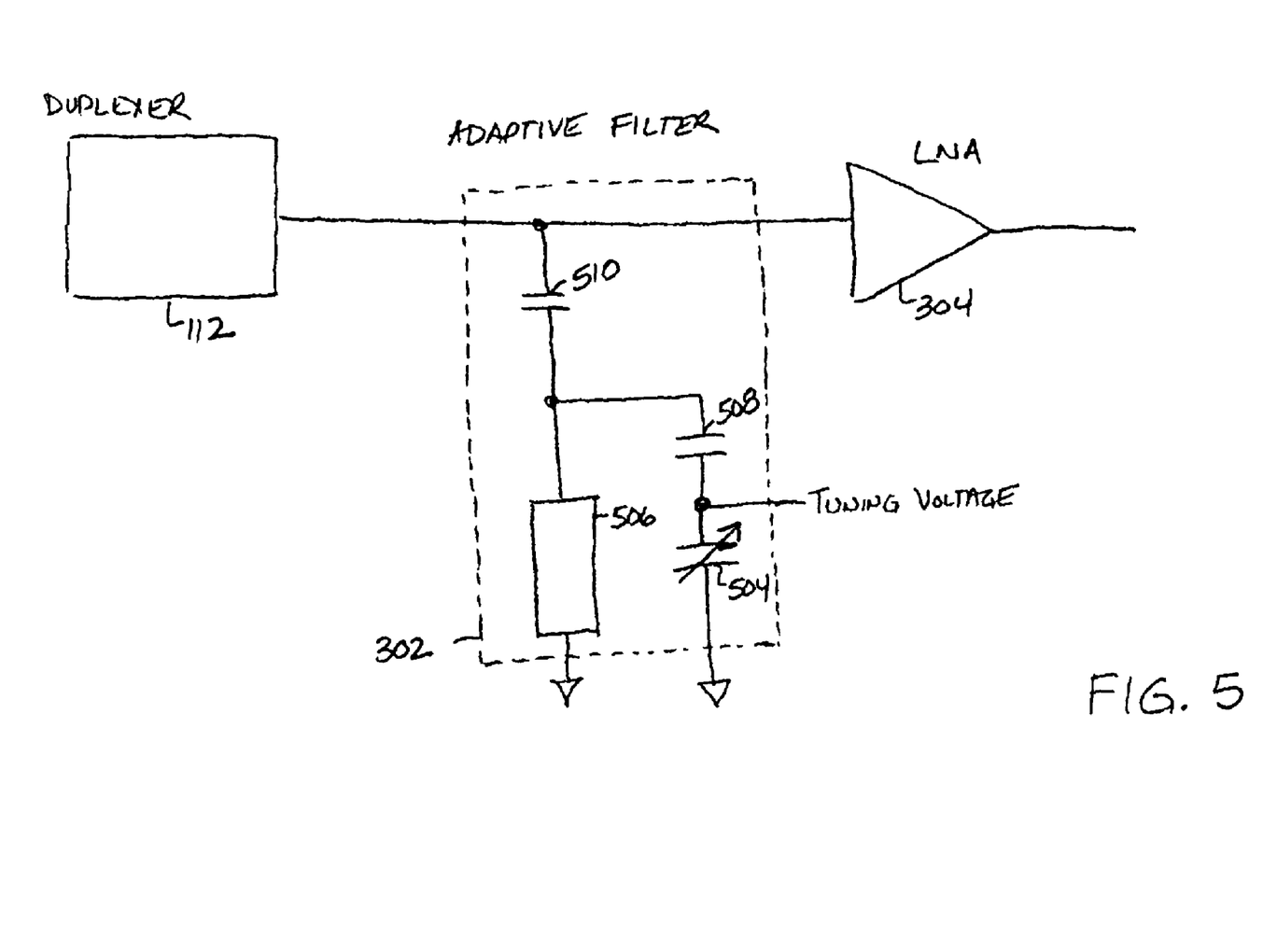
FIG. 5 is a schematic diagram illustrating an example of a tunable notch filter for use in a transceiver of a wireless communications device.

Another example of an adaptive filter operating in the receiver of a CDMA wireless communications device is shown in FIG. 5. In this configuration, the adaptive filter 302 may be implemented as a tunable notch filter. The notch may be tuned to the transmitter operating frequency in the presence of jammers when the transmit power is high. Conversely, when the transmit power is low, the notch may be tuned out of the transmitter frequency band, even when the wireless communication device is operating in the presence of jammers.

The tunable notch filter may be implemented as a separate filter as shown in FIG. 5, or alternatively be integrated into the duplexer 112 or the LNA 304. The configuration of the tunable notch filter may vary depending on the particular application and the overall design constraints. In at least one embodiment of a tunable notch filter, a variable capacitor in the form of a thin film ferro-electric capacitor 504 may be used. A thin film ferro-electric capacitor may be constructed from a ferro-electric material sandwiched between two conductor plates. Ferro-electric materials are a class of materials, typically ceramic rare-earth oxides, whose prominent feature is that their dielectric constant changes in response to an applied slowly varying (DC or low frequency) electric field. Since the capacitance of a capacitor depends on the dielectric constant of the material between the conductor plates, the ferro-electric capacitor is well suited for this application.

The ferro-electric capacitor 504 may be coupled in shunt with a resonator 506. The resonator 506 is shown as a ¼ wavelength short-circuited resonator, but may also be a ½ wavelength open-circuited resonator. The resonator 506 may be either ceramic loaded, slabline (monoblock), or stripline, just to mention a few. A DC blocking capacitor 508 may be used so that a tuning voltage may be applied to the ferro-electric capacitor 504. The order of the ferro-electric capacitor 504 and the DC blocking capacitor 508 may be reversed in different implementations, and the tuning voltage may be a positive or negative voltage. A fixed value capacitor 510 may be used between the LNA 304 and the shunt combination of the ferro-electric capacitor 502 and the resonator 504.

There may be a number of advantages in using thin film ferro-electric capacitors in the tunable notch filter. These capacitors offer better Q, thus lower loss, and better tuning range compared to varactor diodes in the frequency range of interest for CDMA. Unlike varactor diodes, ferro-electric capacitors may be operated at 0 volts DC bias. They may also may be integrated into a wide variety of ceramic substrate materials and may be stacked in series to reduce the RF voltage across each individual capacitor. Stacking is often used for linearity and power handling, both which tend to impact system performance.

The manner in which the adaptive filter is controlled may take on various forms. In at least one embodiment of a CDMA wireless communication device, the filter may be controlled by an adaptive filter algorithm. The adaptive filter algorithm may be implemented in hardware, software, firmware, or any combination thereof. By way of example, the adaptive filter algorithm may be embodied in software and run on a general purpose or specific application processor, such as a digital signal processor (DSP). Alternatively, the adaptive filtering algorithm may be implemented in an application specific integrated circuit (ASIC), programmable logic, discrete gate or transistor logic, discrete hardware components, or any other suitable way. In at least one embodiment of the CDMA wireless communications device, the adaptive filtering algorithm is software supported by a microprocessor in the baseband processor 310. This is an efficient design because the baseband processor 310 most likely will have a resident microprocessor for managing communications. The adaptive filtering algorithm, and the supporting hardware in software implementations of the algorithm, will be referred to herein as a "processor." In the case of software implementations, the term "processor" will apply regardless of whether the software is run on a shared processor (e.g., the microprocessor in the baseband processor 310), or a stand-alone entity in the CDMA wireless communications device.

The processor may be configured to periodically test the receiver for cross modulation, which produces a spectrum that overlaps the operating frequency of the receiver. In the switch filter configuration shown in FIG. 4, the processor may perform this test by periodically toggling the switches 404*a* and 404*b* and measuring the digital signal power level under both switch conditions. Similarly, in the tunable filter configuration shown in FIG. 5, the baseband processor 310 may perform this test by periodically tuning the notch in and out of the transmitter frequency band and measuring the digital signal power level under both conditions. The difference in signal power level between the two conditions, whether it be a switch or tunable filter, may be used to detect cross modulation. More specifically, the difference in signal power under the two conditions in the absence of cross modulation will be equal to the insertion loss of the filter 302. However, when cross modulation is present, the difference in signal power under the two conditions will be equal to the insertion loss of the filter 302 plus the reduction of in-band energy at the output of the LNA 304. A substantial difference in signal power level under the two conditions may be used by the processor to detect cross modulation. Those skilled in the art will be readily able to determine the appropriate threshold levels to use in the processor to detect cross modulation.

As discussed earlier, cross modulation generally impacts receiver performance only when the transmit power is high, irrespective of whether a jammer is present. Accordingly, in at least one embodiment of a CDMA wireless communications device, the processor only tests the receiver for cross modulation when the transmit power is above a threshold level. When the transmit power is below the threshold, the processor reduces the in-band insertion loss of the receiver by connecting the duplexer 112 directly to the LNA 304 in the case of a switch filter, or moving the notch out of the transmitter frequency band in the case of a tunable notch filter.

The processor may generate a control signal to operate the adaptive filter 302 based on the testing described above. The control signal may be a switch control in the case of a switch filter, or a tuning voltage in the case of a tunable filter.

Figure 6:
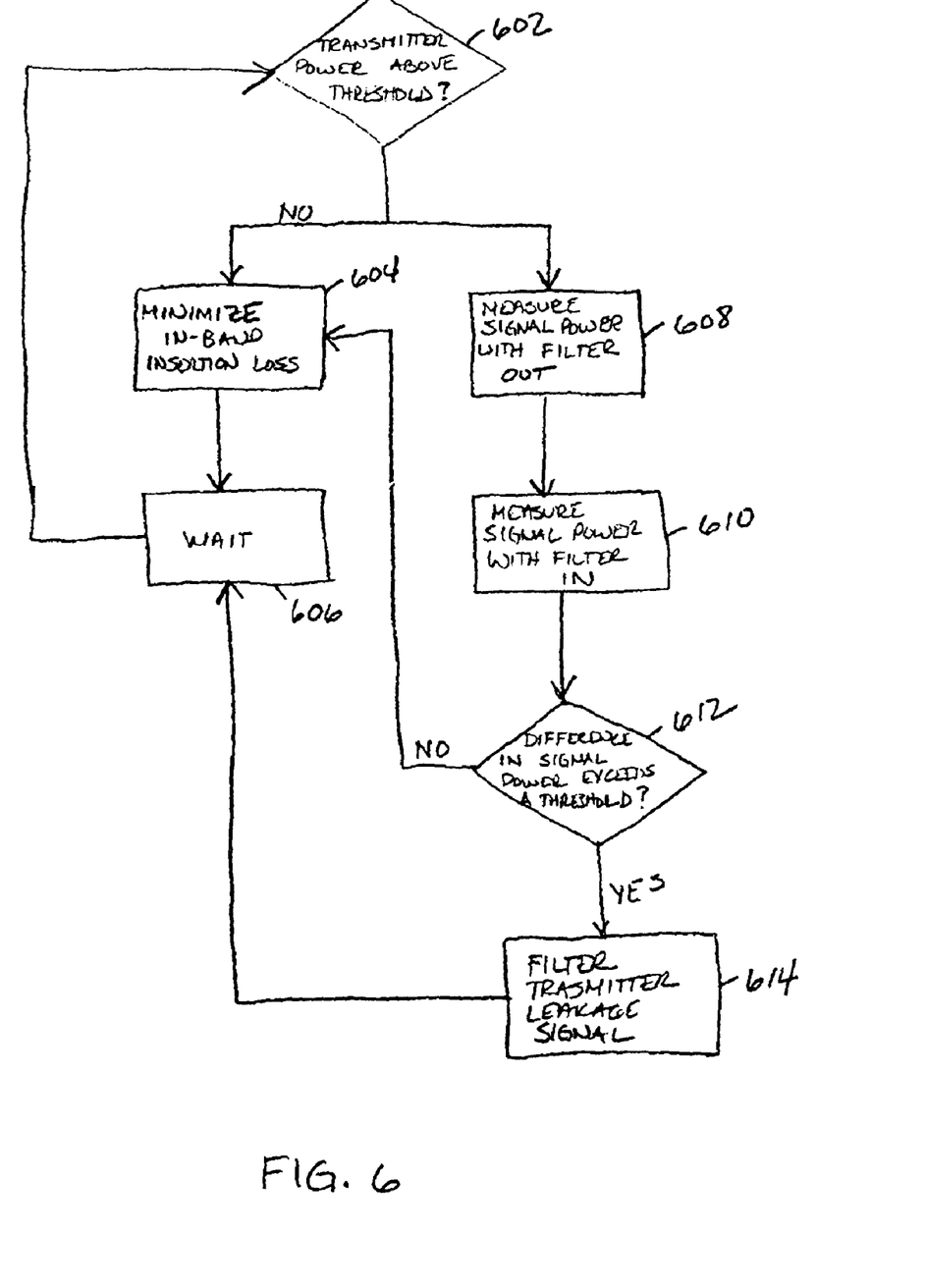
FIG. 6 is a flow diagram illustrating an example of an adaptive filter algorithm for tuning a transceiver in a wireless communications device.

FIG. 6 is a flow diagram illustrating an example of the functionality of the processor. Referring to the flow diagram, the processor initially compares the power level of the transmitter to a threshold in step 602. The power level of the transmitter is known by the wireless communications device based on feedback from the base station it receives as part of the power control loop or output power measurements made by the wireless communications device. If the adaptive filter algorithm determines that the power level of the transmitter is below the threshold, the in-band insertion loss of the receiver is minimized in step 604. This is achieved by bypassing the bandpass filter in the case of a switch filter, or tuning the notch out of the transmitter frequency band in the case of a tunable notch filter. In any event, the processor waits a predetermined time in step 606, until it loops back to step 602 to determine again whether the power level of the transmitter is above the threshold.

If the processor determines in step 602 that the power level of the transmitter is above the threshold, then the processor will test the receiver for cross modulation. This may be achieved by bypassing the bandpass filter in the case of a swich filter, or tuning the notch out of the transmitter frequency band in the case of a notch filter, and measuring the digital signal power level in step 608. The bandpass filter may then be switched back into the signal path between the duplexer and the LNA in the case of a switch filter, or the notch may be tuned into the transmitter frequency band in the case of a notch filter, and the digital signal power level measured again in step 610. The difference in the signal power level under the two conditions may then be compared to a threshold in step 612. If the difference in the signal power level exceeds the threshold, then the processor may switch the bandpass filter into the signal path between the duplexer and the LNA in the case of a switch filter, or tune the notch into the transmitter frequency band in the case of a notch filter, to filter the transmitter leakage signal in step 614. The processor may then loop back to step 606 and wait a predetermined time before repeating the process. If, on the other hand, the difference in the signal power level is below the threshold, then the processor may minimize the in-band insertion loss of the receiver in step 604 by bypassing the bandpass filter in the case of a switch filter, or tuning the notch out of the transmitter frequency band in the case of a tunable notch filter. The processor then waits a predetermined time in step 606, until it loops back to step 602 to determine again whether the power level of the transmitter is above the threshold.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A communications device, comprising:
   a transmitter;
   a receiver;
   a duplexer coupled to the transmitter and the receiver;
   an adaptive filter in a receive signal path of at least a jammer signal between the duplexer and the receiver; and
   a processor configured to monitor cross modulation in the receiver between transmitter leakage through the duplexer and a jammer by comparing a signal power level within the adaptive filter during a condition to the signal power level during a subsequent, different condition, and adapt the adaptive filter to filter a transmitter leakage signal if a difference between the signal power level during the condition and the signal power level during the subsequent, different condition exceeds an insertion loss of the adaptive filter and adapt the adaptive filter to bypass filtering if the difference is equal to or less than the insertion loss.

2. The communications device of claim 1 wherein the adaptive filter comprises a tunable notch filter.

3. The communications device of claim 2 wherein the tunable notch filter includes a variable capacitor comprising a ferro-electric capacitor.

4. The communications device of claim 2 wherein the processor is further configured to adapt the filter by tuning the notch of the filter in frequency.

5. The communications device of claim 4 wherein the processor is further configured to monitor the cross modulation in the receiver by monitoring the level of transmit power, and wherein the processor is further configured to adapt the filter by tuning the notch of the filter out of the frequency band of the transmitter if the transmitter power is below a threshold.

6. The communications device of claim 5 wherein the processor is further configured to monitor the cross modulation in the receiver by determining whether the cross modulation is above a level when the level of transmit power is above the threshold, and wherein the processor is further configured to adapt the filter by tuning the notch of the filter into the frequency band of the transmitter if the cross modulation is above the level.

7. The communications device of claim 6 wherein the processor is further configured to determine whether the cross modulation in the receiver is above the level by tuning the notch of the filter into and out of the frequency band of the transmitter, and measuring the difference in signal power output from the receiver between the two conditions.

8. The communications device of claim 1 wherein the adaptive filter comprises a switch filter having a bandpass filter with a bandpass region covering the operating frequency of the receiver.

9. The communications device of claim 8 wherein the switch filter further comprises a switching circuit configured to switch the bandpass filter into and out of the signal path between the duplexer and the receiver.

10. The communications device of claim 9 wherein the switching circuit comprises a first switch connected between the duplexer and the bandpass filter and a second switch connected between the bandpass filter and the receiver.

11. The communications device of claim 9 wherein the processor is further configured to adapt the filter by switching the bandpass filter into or out of the signal path between the duplexer and the receiver.

12. The communications device of claim 11 wherein the processor is further configured to monitor the cross modulation in the receiver by monitoring the level of transmit power, and wherein the processor is further configured to adapt the filter by switching the bandpass filter out of the signal path between the duplexer and the receiver if the transmitter power is below a threshold.

13. The communications device of claim 12 wherein the processor is further configured to monitor the cross modulation in the receiver by determining whether the cross modulation is above a level when the level of transmit power is above the threshold, and wherein the processor is further configured to switch the bandpass filter into the signal path between the duplexer and the receiver if the cross modulation in the receiver is above the level.

14. The communications device of claim 13 wherein the processor is further configured to determine whether the cross modulation in the receiver is above the level by switching the bandpass filter into and out of the signal path between the duplexer and the receiver, and measuring the difference in signal power output from the receiver between the two conditions.

15. A method of adaptive filtering in a communications device, the communications device having a transmitter, a receiver, a duplexer coupled to the transmitter and the receiver, and an adaptive filter in a receive signal path of at least a jammer signal between the duplexer and the receiver, the method comprising:
monitoring cross modulation in the receiver between transmitter leakage through the duplexer and a jammer by comparing a signal power level within the adaptive filter during a condition to the signal power level during a subsequent, different condition; and
adapting the adaptive filter to filter a transmitter leakage signal if a difference between the signal power level during the condition and the signal power level during the subsequent, different condition exceeds an insertion loss of the adaptive filter and adapt the adaptive filter to bypass filtering if the difference is equal to or less than the insertion loss.

16. The method of claim 15 wherein the adaptive filter comprises a tunable notch filter.

17. The method of claim 16 wherein the tunable notch filter includes a variable capacitor comprising a ferro-electric capacitor.

18. The method of claim 16 wherein the filter is adapted by tuning the notch of the filter in frequency.

19. The method of claim 18 wherein the cross modulation in the receiver is monitored by monitoring the level of transmit power, and wherein the filter is adapted by tuning the notch of the filter out of the frequency band of the transmitter in response to the transmitter power being below a threshold.

20. The method of claim 18 wherein the cross modulation in the receiver is monitored by monitoring the level of transmit power, and determining whether the cross modulation in the receiver is above a level in response to the level of transmit power being above the threshold, and wherein the filter is adapted by tuning the notch of the filter into the frequency band of the transmitter in response to the cross modulation in the receiver being above the level.

21. The method of claim 20 wherein the determination of whether the cross modulation in the receiver is above the level comprises tuning the notch of the filter into and out of the frequency band of the transmitter, and measuring the difference in signal power output from the receiver between the two conditions.

22. The method of claim 15 wherein the adaptive filter comprises a switch filter having a bandpass filter with a bandpass region covering the operating frequency of the receiver.

23. The method of claim 22 wherein the switch filter further comprises a switching circuit configured to switch the bandpass filter into and out of the signal path between the duplexer and the receiver.

24. The method of claim 23 wherein the switching circuit comprises a first switch connected between the duplexer and the bandpass filter and a second switch connected between the bandpass filter and the receiver.

25. The method of claim 23 wherein the filter is adapted by switching the bandpass filter into or out of the signal path between the duplexer and the receiver.

26. The method of claim 25 wherein the cross modulation in the receiver is monitored by monitoring the transmit power, and wherein the filter is adapted by switching the bandpass filter out of the signal path between the duplexer and the receiver in response to the transmitter being below a threshold.

27. The method of claim 25 wherein the cross modulation in the receiver is monitored by monitoring the level of transmit power, and determining whether the cross modulation in the receiver is above a level in response to the transmitter power being above the threshold, and wherein the filter is adapted by switching the bandpass filter into the signal path between the duplexer and the receiver in response to the cross modulation in the receiver being above the level.

28. The method of claim 27 wherein the determination of whether the cross modulation in the receiver is above the level comprises switching the bandpass filter into and out of the signal path between the duplexer and the receiver, and measuring the difference in signal power output from the receiver between the two conditions.

29. A communications device, comprising:
a transmitter;
a receiver;
a duplexer coupled to the transmitter and the receiver;
means for monitoring cross modulation in the receiver between transmitter leakage through the duplexer and a jammer by comparing a signal power level within an adaptive filter coupled to the receiver during a condition to the signal power level during a subsequent, different condition; and
means, in a receive signal path of at least a jammer signal between the duplexer and the receiver, for filtering a transmitter leakage signal if a difference between the signal power level during the condition and the signal power level during the subsequent, different condition exceeds an insertion loss of the adaptive filter and adapt the adaptive filter to bypass filtering if the difference is equal to or less than the insertion loss.

* * * * *